United States Patent [19]

Ogata et al.

[11] Patent Number: 5,142,568
[45] Date of Patent: Aug. 25, 1992

[54] DATA COMMUNICATION APPARATUS WHICH CAN USE EITHER AN ANALOG OR A DIGITAL LINE

[75] Inventors: Yukihiko Ogata, Kawasaki; Naoto Kagami, Yokohama, both of Japan

[73] Assignee: Canon Kabushiki Kaisha, Tokyo, Japan

[21] Appl. No.: 604,991

[22] Filed: Oct. 29, 1990

Related U.S. Application Data

[63] Continuation of Ser. No. 276,931, Nov. 28, 1988, abandoned.

[30] Foreign Application Priority Data

Nov. 30, 1987 [JP] Japan ............................ 62-303650
Dec. 28, 1987 [JP] Japan ............................ 62-334988
Jan. 8, 1988 [JP] Japan ............................ 63-001320
Jan. 8, 1988 [JP] Japan ............................ 63-001321

[51] Int. Cl.⁵ ................................... H04M 11/00
[52] U.S. Cl. .............................. 379/100; 358/442
[58] Field of Search ................... 379/94, 100, 93; 358/425, 400, 401, 442

[56] References Cited

U.S. PATENT DOCUMENTS

| | | | |
|---|---|---|---|
| 4,058,838 | 11/1977 | Cragger et al. | 358/425 |
| 4,532,377 | 7/1985 | Zink | 379/94 |
| 4,746,986 | 5/1988 | Tanigawa | 358/256 |
| 4,771,335 | 9/1988 | Obara | 358/280 |
| 4,774,590 | 9/1988 | Haganuma et al. | 358/280 |
| 4,876,604 | 10/1989 | Nobuta | 358/434 |
| 4,910,610 | 3/1990 | Utsugi | 358/434 |
| 4,970,603 | 11/1990 | Kanai | 358/400 |
| 4,974,097 | 11/1990 | Kaneko et al. | 358/400 |

OTHER PUBLICATIONS

Summer, Eric E. "ISDN—The Telephone of Tomorrow", Radio Electronics, vol. 59, No. 10, Oct. 1988, pp. 41-50.

Primary Examiner—James L. Dwyer
Assistant Examiner—Wing F. Chan
Attorney, Agent, or Firm—Fitzpatrick, Cella, Harper & Scinto

[57] ABSTRACT

A data communication apparatus includes an analog communication unit for performing analog communication, an A/D converter for converting the analog signal from the analog communication unit into a digital voice signal, and an ISDN communication control unit for sending the digital voice signal from the A/D converter onto a digital communication line. Data used in an ISDN are voice data, image data, facsimile communication data, etc.

14 Claims, 8 Drawing Sheets

DATA COMMUNICATION APPARATUS WHICH CAN USE EITHER AN ANALOG OR A DIGITAL LINE

This application is a continuation of application Ser. No. 07/276,931, filed Nov. 28, 1988 now abandoned.

BACKGROUND OF THE INVENTION

1. Field of the Invention

The present invention relates to a data communication apparatus and, more particularly, to a data communication apparatus which can be connected to a digital communication line.

2. Related Background Art

An ISDN (Integrated Service Digital Network) is known as a conventional digital communication network.

The ISDN is a digital communication network for offering various types of service such as telephone service, data service, and facsimile communication service. An interface between each user and the network is recommended by the CCITT.

Figure 3:
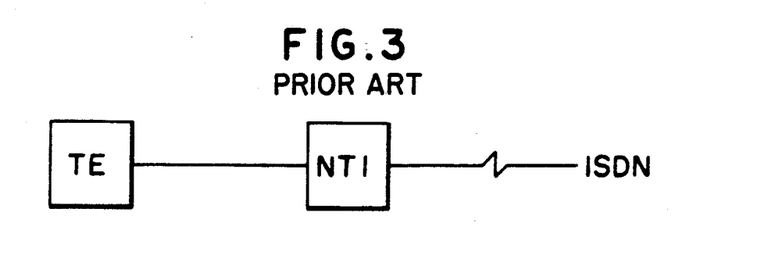
FIG. 3 is a block diagram showing a standard arrangement of an ISDN subscriber.

A standard arrangement of an ISDN subscriber is shown in FIG. 3. A TE (ISDN terminal equipment) is connected to an $NT_1$ (network terminal) and an interface according to CCITT recommendation I.430, so that the $NT_1$ is connected to the ISDN. A voice from a telephone or image data from a facsimile machine is communicated as a 64-Kbps digital signal via the B channel. Signal information such as link control and call control data are communicated as a 16-Kbps signal via the D channel.

A G3 facsimile machine is a communicating means which is most popular these days. By using a public telephone network, image data is sent using a modem having a transmission speed of 4,800 bps (V27 ter) or 9,600 bps (V29). A procedure signal is sent via a modem of 300 bps (V21).

Figure 4:
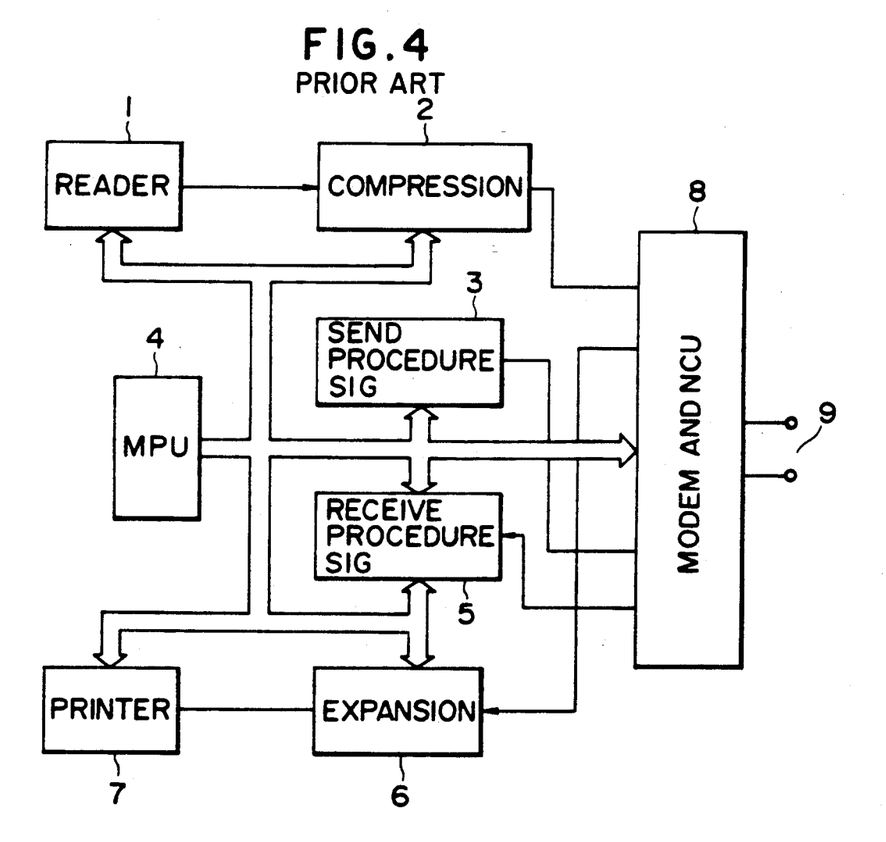
FIG. 4 is a block diagram showing a general arrangement of a G3 facsimile machine.

FIG. 4 shows a general arrangement of a G3 facsimile machine.

Referring to FIG. 4, the G3 facsimile machine includes a reader 1 for reading a "send" original (i.e., an original to be sent), a compression circuit (COMPRESSION) 2 for compressing the read data from the reader 1 by an MH or MR coding scheme, a "SEND PROCEDURE SIG" or procedure signal transmitter 3 for generating a procedure signal of the G3 facsimile machine, a control unit (MPU) 4 for controlling the overall operations of the facsimile machine, a "RECEIVE PROCEDURE SIG" or procedure signal receiver 5 for analyzing a received G3 facsimile procedure signal, a data expansion circuit (EXPANSION) 6 for expanding the received image data, and a printer 7 for printing an output from the expansion circuit 6. The facsimile machine also includes a modem and NCU 8 for modulating/demodulating image data and the procedure signal and performing network control, and a terminal 9 connected to a public telephone network.

Original data read by the reader 1 is compressed by the compression circuit 2. The procedure signal generated by the procedure signal transmitter 3 is modulated by a low-speed modem in the modem and NCU 8 and is then sent onto a communication line. A procedure signal received from the communication line is demodulated by the low-speed modem in the modem and NCU 8, and the demodulated procedure signal is decoded by the procedure signal receiver 5. The image data compressed by the compression circuit 2 is modulated by a high-speed modem in the modem and NCU 8. The modulated image data is sent onto the communication line. Image data received from the communication line is demodulated by the high-speed modem, and the modulated image data is expanded by the expansion circuit 6. The expanded data is printed at the printer 7.

This G3 facsimile machine performs communication via an analog communication line and cannot be used in a digital communication network.

In order to connect the above G3 facsimile machine to a digital communication line, an analog signal output from the modem in the G3 facsimile machine can be converted into a digital signal, while a digital signal from the digital communication network can be converted into an analog signal which is then input to the modem in the G3 facsimile machine.

In this case, however, in the process of A/D-converting a signal D/A-converted by the modem in the G3 facsimile machine again, quantization errors tend to occur, and the circuit arrangement is undesirably complicated.

A facsimile machine having a G3/G4 function is disclosed in U.S. patent application Ser. No. 120,104 filed on Nov. 13, 1987 and a G3 facsimile ISDN adaptor is disclosed in U.S. patent application Ser. No. 192,542 filed on May 11, 1988.

SUMMARY OF THE INVENTION

It is an object of the present invention to improve a data communication apparatus in consideration of the above problems.

It is another object of the present invention to allow connection of an analog data communication apparatus to a digital communication line.

It is still another object of the present invention to provide an analog data communication apparatus which can also be connected to a digital communication line.

It is still another object of the present invention to improve reliability and reduce quantization errors when an analog data communication apparatus is connected to a digital communication line.

The above and other objects, features, and advantages of the present invention will be apparent from the following detailed description of the preferred embodiments, taken in conjunction with the accompanying drawings.

DETAILED DESCRIPTION OF THE PREFERRED EMBODIMENTS

The preferred embodiments of the present invention will be described in detail with reference to the accompanying drawings.

A facsimile machine having Group 4 (G4) and Group 3 (G3) facsimile functions as defined in the CCITT recommendations, and which can be connected to a digital network, will be described as a first embodiment.

Figure 1:
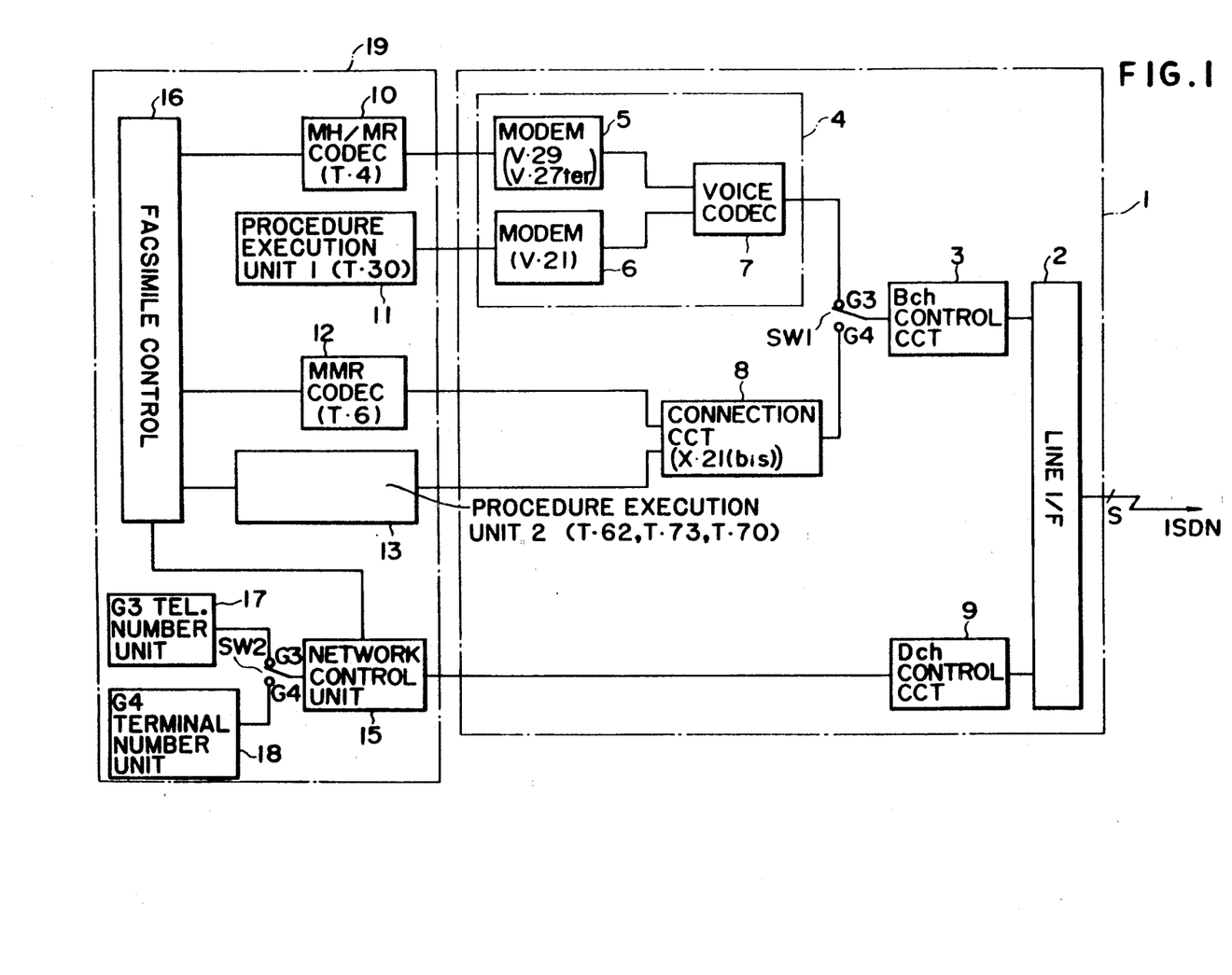
FIG. 1 is a block diagram showing an arrangement of a data communication apparatus according to a first embodiment of the present invention.

FIG. 1 is a block diagram showing an arrangement of the first embodiment. The facsimile machine has a processing unit 19 having G3 and G4 facsimile functions and a line control unit 1 which is a characteristic feature of the first embodiment.

In this embodiment, an ISDN (Integrated Service Digital Network) is exemplified as a digital line. A portion corresponding to a subscriber line is referred to as an S interface hereinafter.

An operation of the facsimile machine of the first embodiment will be described below, taking as an initial example operation as a G4 machine. In this case, assume that switches SW1 and SW2 in FIG. 1 are set to the G4 side.

The facsimile processing unit 19 includes a facsimile control 16 which controls various operations to cause the data communication apparatus to serve as a facsimile machine. The facsimile control 16 comprises a microcomputer, a ROM (Read-Only Memory), a RAM (Random Access Memory), and the like. Prior to facsimile communication, the facsimile control 16 operates a network control unit 15. A G4 terminal number output unit (TERMINAL NUMBER) 18 is used to execute outgoing and incoming procedures. These procedures are executed by using the ISDN D channel. The network control unit 15 is connected to the S interface through a Dch control circuit 9 and a line I/F 2. After connections with the network are completed, facsimile communication is started. The facsimile control 16 operates a procedure execution unit (PROCEDURE 2) 13 prior to image communication. The procedure execution unit 13 is a G4 communication procedure execution unit complying with the CCITT T62, T73, and T70 recommendations. The procedures T62, T73, and T70 are connected to the SW1 through a connection circuit 8. The connection circuit 8 comprises a digital communication connection circuit complying with the CCITT recommendations. These procedures and the image are communicated via the ISDN B channel. The connection circuit 8 is connected to the S interface via a Bch control circuit 3 and the line I/F 2.

Thereafter, the facsimile control 16 operates a codec 12 to start image data communication. The codec 12 performs image data coding and decoding complying with CCITT recommendation T6 to compress and expand the image data. Coding/decoding complying with the T6 recommendation will be referred to as an MMR (Modified Modified READ) codec operation hereinafter. The image data is communicated via the B channel in the ISDN network and is connected to the S interface via the connection circuit 8, the Bch control circuit 3, and the line I/F 2.

Image communication using the G4 facsimile function is performed by the above operations.

Operation of the facsimile machine as a G3 machine will be described below.

In this case, assume that the SW1 and SW2 in FIG. 1 are set to the G3 side.

Prior to facsimile communication, the facsimile control 16 operates the network control unit 15 to b perform an outgoing or incoming procedure by using a G3 telephone number from a G3 telephone number output unit 17. The output unit 17 actually outputs a telephone number of a digital telephone set. When the procedure is completed via the network control unit 15, the Dch control circuit 9, and the line I/F 2, voice communication with a terminal at the other end of the line is established. In this state, voice communication with a digital telephone can be performed via the B channel, although this arrangement is not illustrated in FIG. 1.

In this manner, when the connection between the network and the terminal at the other end of the line is established, facsimile communication is started.

Prior to image communication, the facsimile control 16 operates a procedure execution unit (PROCEDURE 1) 11. The procedure execution unit 11 executes G3 (and G2) communication control procedures complying with CCITT recommendation T30.

These communication procedures are executed by using analog signals (voice band) via a modem 6. Since the conventional G3 facsimile machine uses an analog communication line, it can perform facsimile communication without any processing. However, in the ISDN network of this embodiment, information must be converted into a digital signal via the modem 6 and a digital telephone voice codec 7, and the digital signal is sent as voice communication data via the B channel. The voice codec 7 is connected to the S interface via the Bch control circuit 3 and the line I/F 2.

The modem 6 is a modem circuit for communication control procedures complying with the CCITT recommendations.

After the communication procedures with the terminal at the other end of the line are completed, the facsimile control 16 operates an MH/MR codec 10 and starts image communication. The codec 10 performs image data G3 coding/decoding complying with the CCITT T4 recommendation to compress/expand the image data. T4 coding/decoding includes two schemes and is called an MH/MR codec operation hereinafter.

This image data is converted into an analog signal (voice band) via a modem 5. The modem 5 is a G3 image communication modem complying with the CCITT recommendations. These image signals are connected to the S interface via the voice codec 7, the Bch control circuit 3, and the line I/F 2.

Image communication using the G3 facsimile function is performed by the above operations.

This embodiment exemplifies the G3/G4 function. When a G2 modem is inserted at the position of the G3 modem, G2 facsimile communication can also be performed.

The present invention is also applicable to a teletex and wordprocessor communication in addition to the facsimile machine. That is, when communication with an analog network data communication apparatus via a digital communication network is to be performed, the codec 7 is used to cause a line control unit for a digital communication network to communicate with the analog network.

Figure 2:
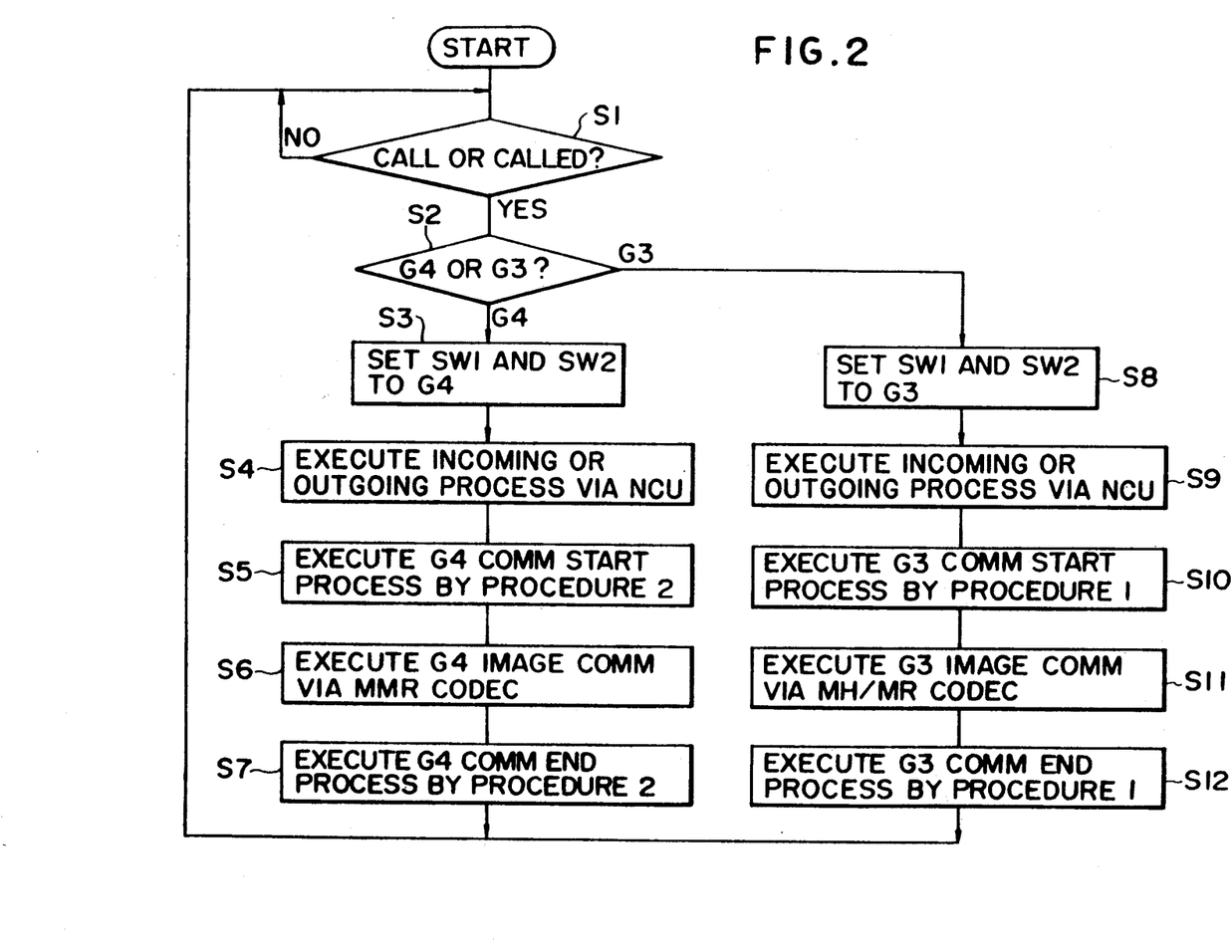
FIG. 2 is a flow chart for explaining control operations of a facsimile control of the first embodiment.

Image communication performed by the arrangement described above will be described. FIG. 2 shows communication control procedures performed by the facsimile control 16 in FIG. 1. The illustrated procedures are stored in the form of a program in a ROM or the like included in the facsimile control 16.

It is determined in step S1 in FIG. 2 whether either an outgoing call ("call") or an incoming call ("called") is being made, in accordance with inputs or calling from the line. If communication is to be performed, the flow advances to step S2 to determine which one of the G3 and G4 modes is used. If the G3 mode is used, the flow advances to step S8. However, if the G4 mode is used, the flow advances to step S3.

In steps S3 and S8, the switches SW1 and SW2 are set to the G4 and G3 sides, respectively.

Communication in the G4 mode will be described below.

The network control unit 15 is operated in step S4 prior to facsimile communication. A terminal number control unit 18 performs the outgoing or incoming process or procedure by using a desired G4 terminal number. The outgoing and incoming processes are performed by using the ISDN D channel via the Dch control circuit 9 and the line I/F 2.

When a call is established between the terminals, facsimile communication is started.

The G4 communication preprocess is performed by using the procedure execution unit 13 in step S5. A procedure signal from the procedure execution unit 13 is input to or output from the Bch control circuit 3 via the connection circuit 8. Therefore, the G4 process is performed via the ISDN B channel.

When the preprocess is completed, coding/decoding is performed via the MMR codec 12, and an image signal is input or output in step S6. These image data are sent or received via the B channel.

When sending of the image signal is completed, the procedure execution unit 13 is used to perform a postprocess in step S7 in the same manner as in step S5, and the flow returns to step S1.

G3 communication from step S9 will be described below.

In step S9, the facsimile control 16 sets a call by using the telephone number output unit 17 and the network control unit 15. The telephone number output unit 17 outputs only a digital telephone number of a telephone set to which a G3 machine at the other end of the line is connected. That is, the G3 machine at the other end of the line inputs or outputs the analog-modulated procedure and the image signal to or from the digital telephone set.

When the call is set, a voice link with the terminal at the other end of the line is established. In this state, voice communication by a digital telephone set via the B channel can be performed.

In step S10, a G3 mode procedure signal is sent or received by using the procedure execution unit 11 to perform the communication preprocess. When communication is to be performed with a G3 machine via an analog line, direct communication can be performed with the line via the modem 6. In this embodiment, however, digital transmission is performed, so that the procedure signal can be input or output via PCM encoding/decoding of a voice band signal by the voice codec 7. The encoded voice signal is input to or output from the B channel.

Coding/decoding by the voice codec 7 is similarly performed in image communication in step S11. More specifically, image data encoded/decoded by the MH/MR codec 10 is input to or output from the modem 5 as digital data. However, the image data is exchanged between the modem 5 and the voice codec 7 as an analog signal. In addition, the digital image signal from the voice codec 7 is input to or output from the line.

When image communication is completed, the postprocess is performed in step S12 in the same manner as in step S10. The flow then returns to step S1.

When the above operations are performed, image communication can be performed with the G3 facsimile machine such that the digital voice signal is input to or output from the line. The G3 machine at the other end of the line can input or output through a predetermined interface image data, a voice band of which is analog-modulated.

With the above arrangement and operations, digital communication is performed to withstand signal distortion on the line, signal degradation by noise or the like, thus performing highly reliable communication.

Figure 5:
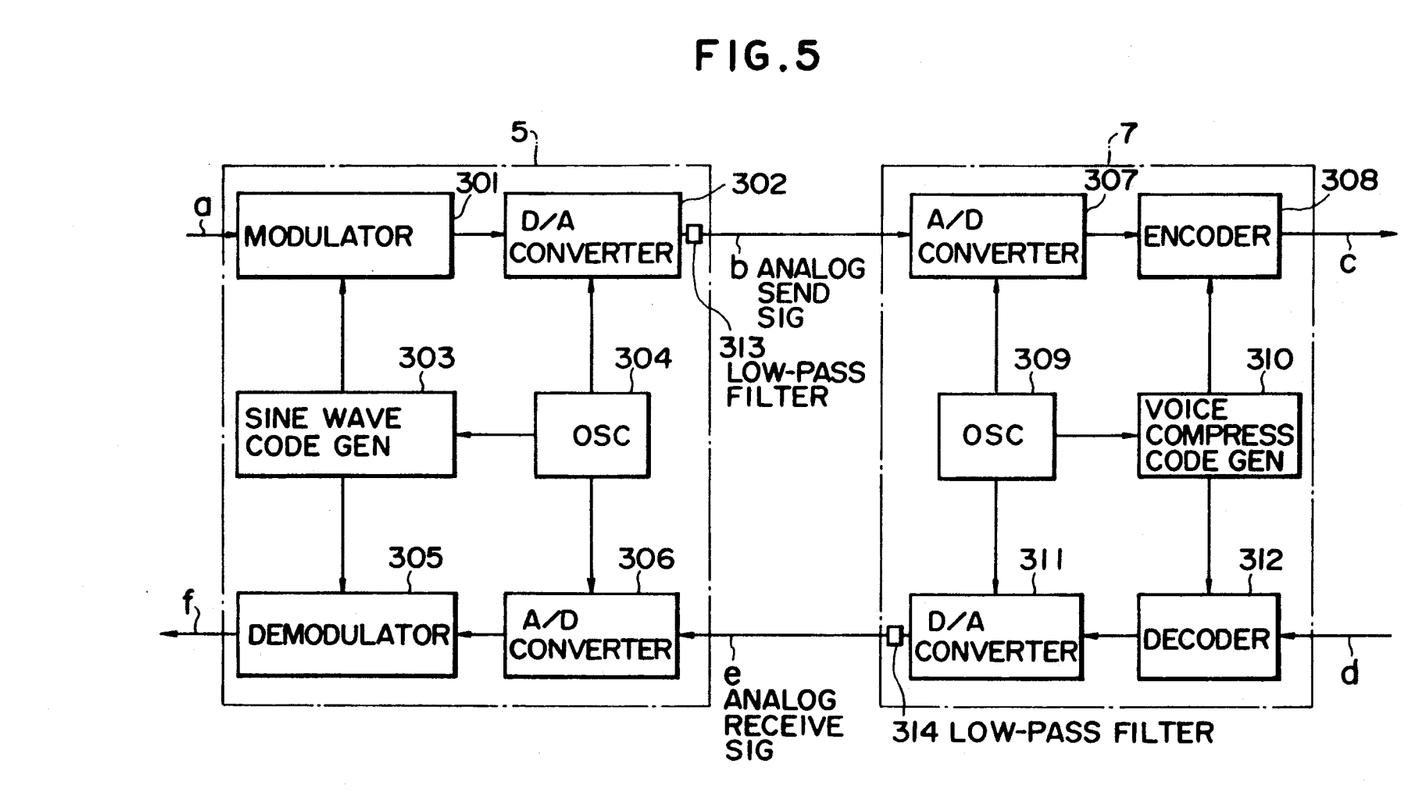
FIG. 5 is a block diagram showing an arrangement of a modem and a voice codec.

The detailed arrangement of a processing unit 4 can be as shown in FIG. 5 when the conventional arrangements of the modem 5 and the voice codec 7 are used without modifications.

As shown in FIG. 5, a modulation section in the modem 5 comprises a modulator 301 and a D/A converter 302, and a demodulation section therein comprises a demodulator 305 and an A/D converter 306. Predetermined sampling clocks are input from an oscillator 304 to the D/A and A/D converters 302 and 306.

A sine wave code generator 303 supplies a sine wave code corresponding a carrier frequency to the modulator 301 and the demodulator 305 in response to the clock output from the oscillator 304. The modulator 301 and the demodulator 305 perform modulation/demodulation by performing digital calculations on the basis of a sine wave code supplied from the sine wave code generator 303.

An encoding section in the voice codec 7 comprises an encoder 308 and an A/D converter 307, and a decoding section therein comprises a decoder 312 and a D/A converter 311. An oscillator 309 supplies sampling clocks to a voice compress code generator 310, the A/D converter 307, and the D/A converter 311.

Low-pass filters 313 and 314 are arranged at output terminals of outputs b and e from the modem 5 and the voice codec 7 to eliminate harmonic noise components, respectively.

With the above arrangement, a digital send signal (image or procedure signal) a input to the modulator 301 in the send mode is modulated by using a sine wave code corresponding to the carrier frequency and output from the sine wave code generator 303, thereby obtaining an analog send signal b.

The A/D converter 307 in the voice codec 7 converts the signal b into a digital signal again. This digital signal is input to the encoder 308. The encoder 308 compresses and encodes the digital signal on the basis of a compression code output from the compress code generator 310, thereby outputting a PCM-modulated send signal c.

In the receive mode, a digital receive signal d input from the line is decoded by the encoder 312 by using a compression code output from the compress code generator 310. The decoded signal is input to the D/A converter 311.

The D/A converter 311 converts this signal into an analog signal e which is then input to the A/D converter 306. The digital receive signal is input to the demodulator 305 and demodulated using the carrier signal output from the sine wave code generator 303, thereby obtaining a digital receive signal f.

With the above arrangement, unnecessary D/A and A/D conversion operations are performed at portions where the modem 5 and the voice codec 7 exchange data.

Figure 6:
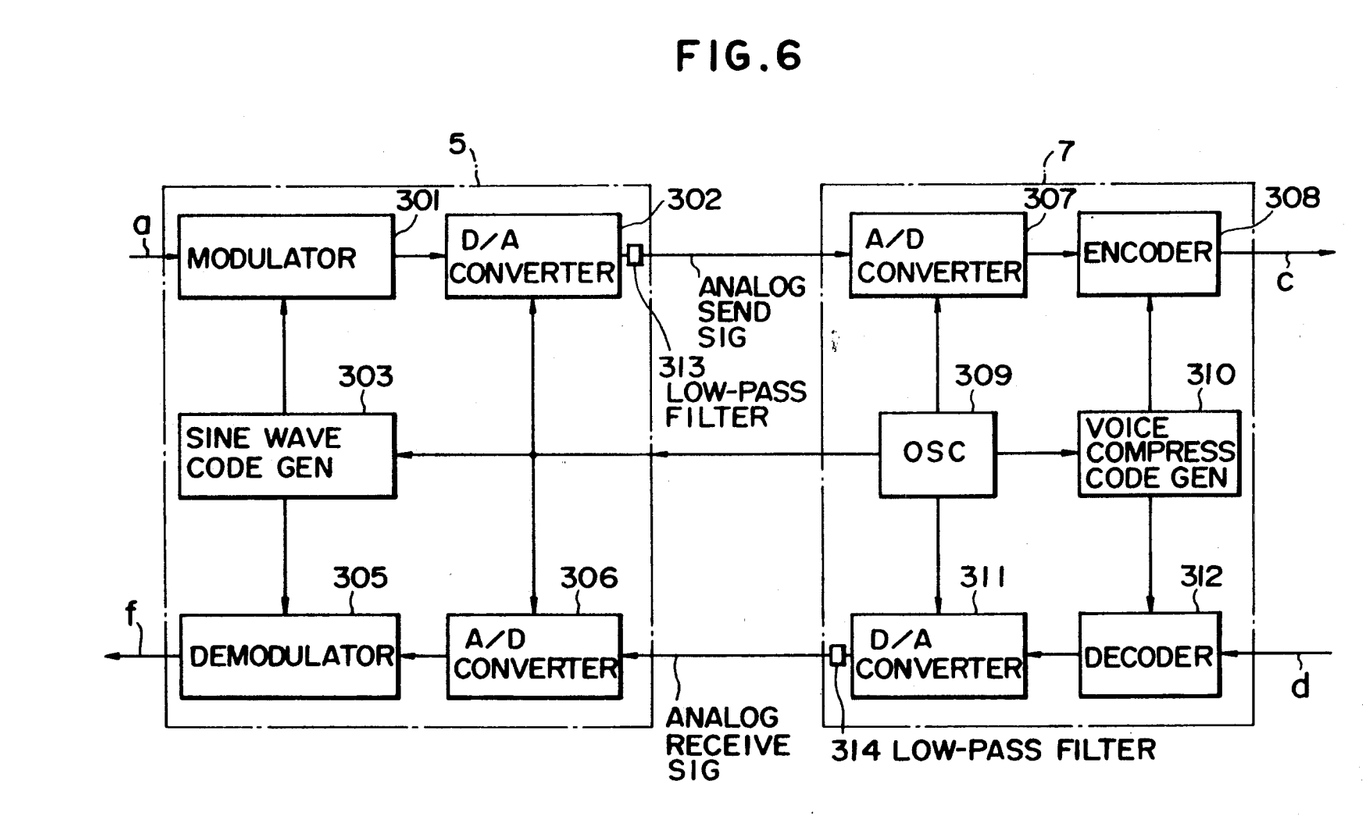
FIG. 6 is a block diagram showing a modification of the modem and the voice codec shown in FIG. 5.

In order to improve on this, parts of the modem 5 and the voice codec 7 can be replaced with a common part, as shown in FIG. 6.

Referring to FIG. 6, a sine wave code generator 303 has an arrangement different from the sine wave code generator 303 in FIG. 5 to operate the generator in the voice codec 7 in response to the clock output from the oscillator 309. In general, the sine wave code generator can be arranged by using a ROM or the like and can be relatively easily modified.

With the above modification, the arrangements of parts of the modem 5 and the voice codec 7 can be greatly simplified to result in low cost. In addition, the same sampling clocks are used for the modem 5 and the voice codec 7 to minimize quantization errors caused during signal exchange between the modem 5 and the voice codec 7, thereby greatly improving reliability of signal transmission.

In the above embodiments and the modification, the G3/G4 facsimile machine is used. However, if a G2 modem is used in place of a G3 modem, A G2/G4 facsimile machine can be arranged. A G2/G3/G4 facsimile machine can be similarly arranged.

As described above, unnecessary D/A and A/D conversion operations are performed at portions where the modem 5 and the voice codec 7 exchange signals in FIG. 5.

Figure 7:
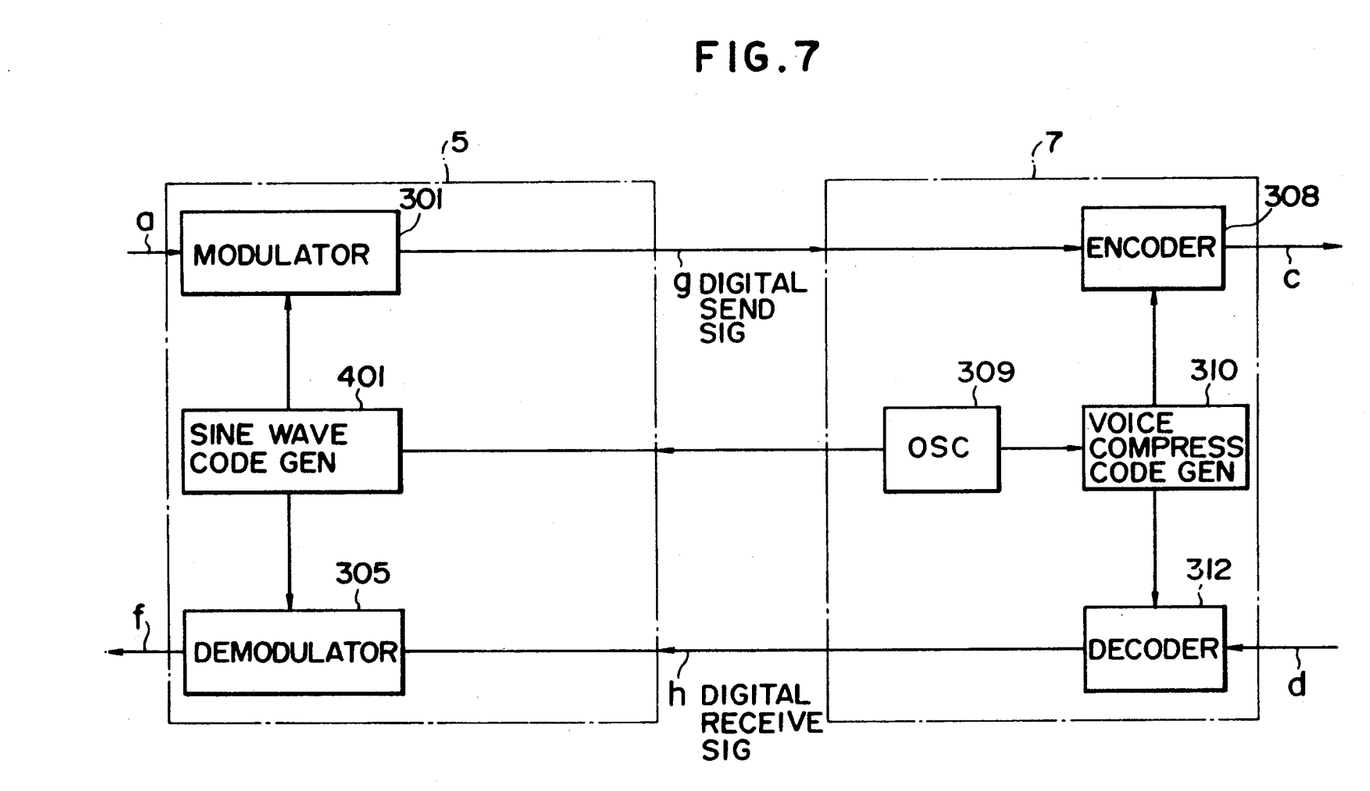
FIG. 7 is a block diagram showing another modification of the modem and the voice codec shown in FIG. 5.

In order to eliminate this drawback, parts of the modem 5 and the voice codec 7 can be replaced with a common part, as shown in FIG. 7.

Referring to FIG. 7, the sine wave code generator 303 in FIG. 5 is modified into a sine wave code generator 401 which can be operated in response to the clock output from the oscillator 309. In general, the sine wave code generator can be arranged by using a ROM or the like and can be relatively easily modified.

If formats of the digital signals (g and h) which are exchanged between the modulator 301 and the encoder 308 and between the decoder 312 and the demodulator 305 can be arranged to be common to both units, these circuits can be directly connected, and the D/A and A/D converters can be omitted.

With the above modification, the arrangements of parts of the modem 5 and the voice codec 7 can be greatly simplified, and therefore, the cost can be greatly reduced. The same sampling clocks are used in the modem 5 and the voice codec 7 and the D/A and A/D converters are omitted to minimize quantization errors caused during signal exchange between the modem 5 and the voice codec 7, thereby improving reliability of signal transmission.

G3 facsimile communication in a digital network without using a G3 facsimile modem will be described according to a second embodiment of the present invention.

Figure 8:
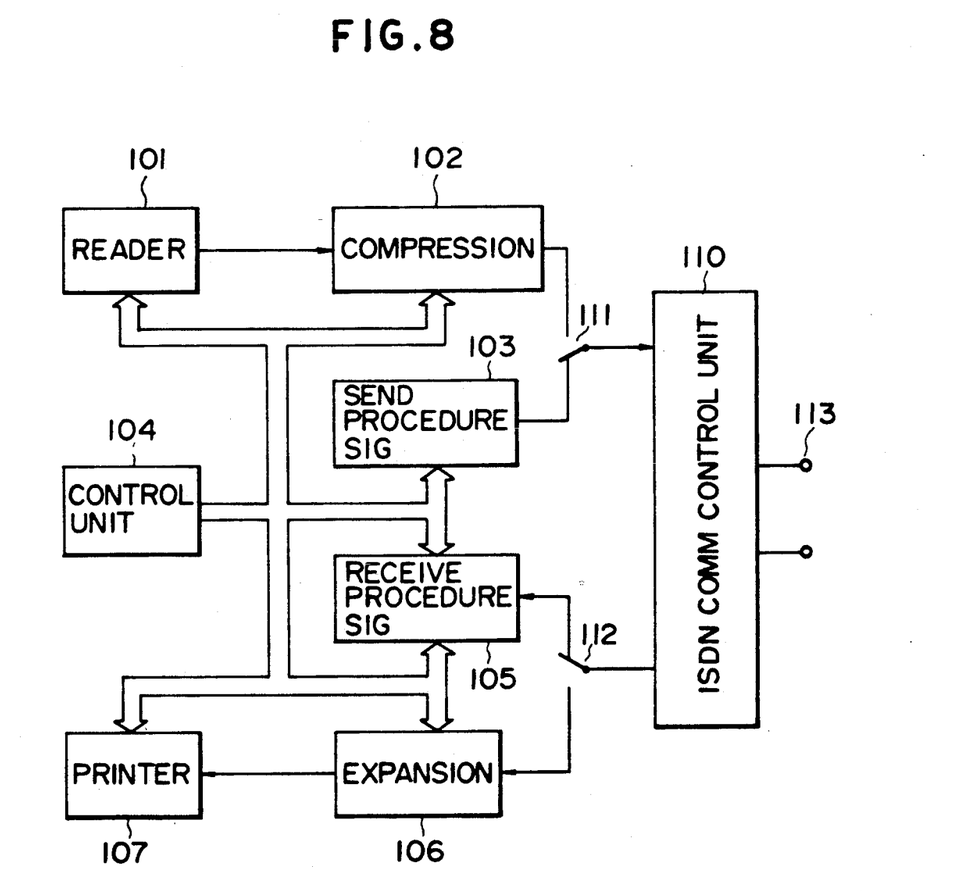
FIG. 8 is a block diagram showing an arrangement of a data communication apparatus according to a second embodiment of the present invention.

FIG. 8 is a block diagram showing an arrangement of the second embodiment.

Referring to FIG. 8, this arrangement includes a reader 101, a compression circuit 102 for compressing an output from the reader 101, a "SEND PROCEDURE SIGNAL" or procedure signal transmitter 103 for generating a G3 facsimile procedure signal, a control unit 104 for controlling the overall operations, a "RECEIVE PROCEDURE SIGNAL" or procedure signal receiver 105 for analyzing the received G3 facsimile procedure signal, an expansion circuit 106 for expanding received image data, and a printer 107 for printing the expanded image data. This arrangement also includes a switch 111 for selecting the image data as an output from the compression circuit 102 or the G3 facsimile send procedure signal as an output from the procedure signal transmitter 103, an ISDN communication control unit 110 for controlling communication with the ISDN, a switch 112 which is operated in response to a receive signal as the G3 facsimile procedure signal or image data, and a terminal 113 connected to an $NT_1$.

With the above arrangement, the switch 111 is connected to the B channel input of the ISDN communication control unit 110. Data of an original read by the reader 101 is compressed by the compression circuit 102. When the switch 111 is connected to the image data, the compressed data is sent as a digital signal via the B channel. However, when the switch 111 is connected to the procedure signal, the G3 facsimile procedure signal is output as the digital signal from the procedure signal transmitter 103.

The switch 112 is connected to the B channel output of the ISDN communication control unit 110. A signal received from the ISDN is output via the B channel of the ISDN communication control unit 110. This signal is input to the procedure signal receiver 105 via the switch 112. When the image data is received, it is input to the expansion circuit 106. An output from the expansion circuit 106 is printed at the printer 107.

Control for sending data to the ISDN and receiving it therefrom is performed by the ISDN communication control unit 110. As described above, the image data and the G3 facsimile procedure signal are sent or received as a digital signal via the B channel of the ISDN.

Figure 9:
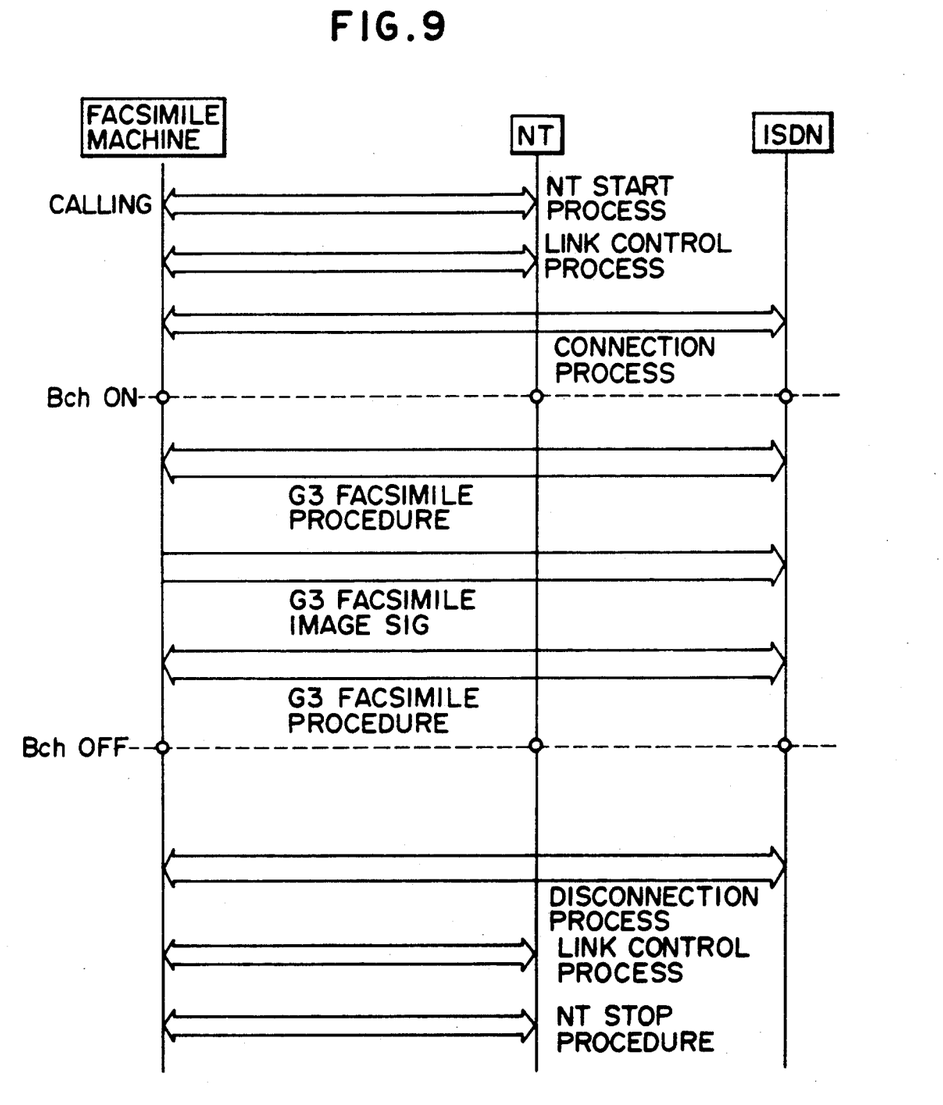
FIG. 9 is a chart showing signal procedures in a "send call" mode of the second embodiment.

FIG. 9 is a chart showing signal processes at the time of calling.

When a facsimile machine performs calling, the ISDN communication control unit 110 performs an NT (network) start process, a link control process, and a connection process for the network to establish a B channel communication line. When an end-to-end communication line by the B channel is established, G3 communication with a facsimile machine at the other end of line is performed by the procedure signal transmitter 103 and the procedure signal receiver 105. The sending original read by the reader 101 is compressed by the compression circuit 102 into an MH or MR code which is then sent to the G3 facsimile machine at the other end of the line.

When sending of original is completed, G3 communication with the facsimile machine at the other end of the line is performed by the procedure signal transmitter 103 and the procedure signal receiver 105, thereby completing the G3 facsimile procedure. When the G3 facsimile procedure is completed, the ISDN communication control unit 110 performs a disconnection process, a link control process, and a network stop procedure for the network, thereby completing communication.

According to the above embodiment, G3 facsimile communication can be performed without using the modulator/demodulator of the G3 facsimile machine.

The above embodiments exemplify the ISDN. However, the present invention is also applicable to a digital communication network such as an ISN.

What is claimed is:

1. A data communication apparatus comprising:
    analog communication means for performing analog communication;
    digital communicating means for performing digital communication;
    means for selectively switching between said digital communicating means and said analog communicating means;
    means for converting the analog signal from said analog communicating means into a digital signal as voice communication data; and
    means for sending the digital signal from said converting means onto a digital communication line, said sending means selectively sending onto said digital communication line one of a digital signal from said digital communicating means and the digital signal from said converting means.

2. An apparatus according to claim 1, wherein said converting means converts the digital signal from said digital communication line into an analog signal and outputs the analog signal to said analog communicating means.

3. An apparatus according to claim 1, wherein said analog communicating means communicates image data.

4. An apparatus according to claim 1, wherein said switching means switches between said analog communicating means and said digital communicating means in accordance with a communication destination.

5. An apparatus according to claim 1, wherein said digital communicating means performs image data communication.

6. A data communication apparatus comprising:
    analog communicating means having a modem, for performing analog communication; and
    means for converting an analog signal from said modem into a digital signal as voice communication data to output the digital signal onto a digital communication line, and for converting a digital signal as voice communication data from the digital communication line into an analog signal to output the analog signal to said modem,
    wherein the analog signal is exchanged between said converting means and a modulator/demodulator circuit in said modem, and said modem and said converting means are operated by the same timing clock pulse.

7. A data communication apparatus, comprising:
    analog communicating means having a modem, for performing analog communication;
    means for converting an output signal from said modem into a digital signal as voice communication data to output the digital signal to the digital communication line and for converting a digital as voice communication data from the digital communication line in an analog signal to output the analog signal to said modem; and
    clock pulse generating means for generating timing clock pulses for operating said modem and said converting means,
    wherein said modem and said converting means are operated by the same timing clock pulse.

8. An apparatus according to claim 7, wherein said analog communicating means communicates image data.

9. An apparatus according to claim 7, further comprising:
    digital communicating means for performing digital communication; and
    means for selectively switching between said digital communicating means and said analog communicating means.

10. An apparatus according to claim 9, wherein said digital communicating means performs image data communication.

11. An apparatus according to claim 9, wherein said switching means switches between said analog communicating means and said digital communicating means in accordance with a communication destination.

12. A facsimile apparatus comprising:
    procedure signal communication means for outputting and receiving G3 facsimile procedure digital signals;
    means for reading an image of an original document to produce image data composed of a digital signal;
    means for compressing the image data from said reading means;
    communication control means for sending to a digital communication line, compressed image data, compressed by said compression means, and the G3 facsimile procedure digital signals output by said procedure signal communication means, and for supplying to said procedure signal communication means the G3 facsimile procedure digital signals received through the digital communication line; and
    means for selectively supplying the G3 facsimile procedure digital signals from said procedure signal communication means and the image data from said compression means, to said communication control means.

13. A facsimile apparatus according to claim 12, wherein said communication control means conducts GIII facsimile communication through the digital communication line.

14. A facsimile apparatus comprising:
    procedure signal communication means for outputting and receiving G3 facsimile procedure digital signals;
    means for expanding received image data;
    means for recording the image data expanded by said expanding means; and
    communication control means for sending the G3 facsimile procedure digital signals output to a digital communication line by said procedure signal communication means, and for receiving the G3 facsimile procedure digital signals and the image data through the digital communication line, supplying the G3 facsimile procedure digital signals from the digital communication line to said procedure signal communication means, and supplying the received image data to said expanding means.

* * * * *

UNITED STATES PATENT AND TRADEMARK OFFICE
CERTIFICATE OF CORRECTION

PATENT NO. : 5,142,568
DATED : August 25, 1992
INVENTOR(S) : YUKIHIKO OGATA, ET AL.

It is certified that error appears in the above-identified patent and that said Letters Patent is hereby corrected as shown below:

COLUMN 4

Line 6, "b" should be deleted.

COLUMN 8

Line 50, "of" should read --of the--.

COLUMN 9

Line 62, "digital" should read --digital signal--.

COLUMN 10

Line 47, "GIII" should read --G3--.

Signed and Sealed this

Seventh Day of September, 1993

*Attest:*

BRUCE LEHMAN

*Attesting Officer*   Commissioner of Patents and Trademarks